United States Patent
Xue et al.

(10) Patent No.: US 10,097,100 B1
(45) Date of Patent: Oct. 9, 2018

(54) FLYBACK CONVERTER

(71) Applicant: NAVITAS SEMICONDUCTOR, INC., El Segundo, CA (US)

(72) Inventors: Lingxiao Xue, Torrance, CA (US); Ju Zhang, Monterey Park, CA (US)

(73) Assignee: Navitas Semiconductor, Inc., El Segundo, CA (US)

( * ) Notice: Subject to any disclaimer, the term of this patent is extended or adjusted under 35 U.S.C. 154(b) by 0 days.

(21) Appl. No.: 15/892,262

(22) Filed: Feb. 8, 2018

Related U.S. Application Data

(63) Continuation of application No. 15/700,067, filed on Sep. 8, 2017, now Pat. No. 9,954,456.

(60) Provisional application No. 62/385,845, filed on Sep. 9, 2016.

(51) Int. Cl.
*H02M 3/335* (2006.01)
*H02M 1/08* (2006.01)
*H02M 1/44* (2007.01)
*H02M 1/00* (2006.01)

(52) U.S. Cl.
CPC ....... *H02M 3/33592* (2013.01); *H02M 1/083* (2013.01); *H02M 1/44* (2013.01); *H02M 2001/0058* (2013.01)

(58) Field of Classification Search
CPC ............. H02M 1/083; H02M 3/33507; H02M 3/33546
See application file for complete search history.

(56) References Cited

U.S. PATENT DOCUMENTS

| 5,991,171 A | 11/1999 | Cheng |
| 6,069,803 A | 5/2000 | Cross |
| 6,373,727 B1 | 4/2002 | Hedenskog et al. |
| 9,954,456 B2 * | 4/2018 | Xue .................. H02M 3/33592 |
| 2002/0101741 A1 | 8/2002 | Brkovic |

(Continued)

FOREIGN PATENT DOCUMENTS

| CN | 104022655 | 9/2014 |
| JP | 2014143909 | 8/2014 |

(Continued)

OTHER PUBLICATIONS

International Search Report and Written Opinion in PCT Application No. PCT/US2017/050828, dated Jan. 8, 2018 in 10 pages.

(Continued)

*Primary Examiner* — Adolf Berhane
*Assistant Examiner* — Afework Demisse
(74) *Attorney, Agent, or Firm* — Kilpatrick Townsend & Stockton

(57) ABSTRACT

A converter circuit is disclosed. The converter circuit includes a transformer and a primary circuit connected to the primary side of the transformer, where the primary circuit includes a first switch connected to a ground. The converter circuit also includes a second switch connected to the first switch, and a clamping capacitor connected to the second switch and to the input. The converter circuit also includes a secondary circuit connected to the secondary side of the transformer, where the secondary circuit includes a rectifying element, and an output capacitor connected to the rectifying element. In addition, the output capacitor has a substantial effect on resonance of the converter circuit.

12 Claims, 7 Drawing Sheets

(56) References Cited

U.S. PATENT DOCUMENTS

2014/0362610 A1   12/2014  Stracquadaini
2016/0099647 A1    4/2016  Zhang et al.
2016/0181927 A1    6/2016  Chang et al.
2018/0076725 A1*  3/2018  Xue .................. H02M 3/33592

FOREIGN PATENT DOCUMENTS

KR     20140096948 A    8/2014
TW         1236206     7/2005

OTHER PUBLICATIONS

Invitation to Pay Add'l Fees and Partial Search Report in PCT Application No. PCT/US2017/050828, dated Oct. 11, 2017 in 2 pages.
TW106131003 , "Office Action", Jul. 25, 2018, 4 pages.

* cited by examiner iLr iS3

FLYBACK CONVERTER

CROSS-REFERENCES TO RELATED APPLICATIONS

This application is a Continuation of U.S. patent application No. 15/700,067, for "FLYBACK CONVERTER" filed Sep. 8, 2017, which claims benefit to U.S. Provisional Application No. 62/385,845, filed Sep. 9, 2016, titled "FLYBACK CONVERTER," the disclosures of which are incorporated herein by reference.

FIELD OF THE INVENTION

The present application generally pertains to flyback converters, and more particularly to flyback converters having resonance significantly affected by the output capacitor.

BACKGROUND OF THE INVENTION

Single-switch flyback converter topologies are popular in many applications. In this category, quasi-resonant flyback can reduce switching loss by means of resonant operation. However, the transformer leakage energy is not recovered and clamps are needed to protect primary and secondary switches. In addition, QR flyback typically operates below 150 kHz to minimize switching losses and EMI.

FIG. 1 is a schematic illustration of a traditional active clamp flyback (ACF) converter with a secondary diode-rectifier. Lm represents the transformer magnetizing inductance, and Lr can be the leakage inductance of the transformer or the leakage inductance of the transformer in series with a discrete inductor. Capacitor Cr is the clamping capacitor and S2 is the clamping switch. S1 is same switch as traditional single-switch flyback has. D1 is the rectifier diode that conducts current to the load. Co is used to filter the switching ripple of the output voltage and has big capacitance.

The switches of the converter of FIG. 1, as well as the other converters discussed herein are driven with a controller (not shown) programmed to cause the converter to generate a voltage across the output capacitor Co using energy from an input at the node shared by capacitor Cr and inductor Lr.

Active clamp flyback (ACF) is a two-switch topology that achieves soft switching and recovers leakage inductance energy. Continuous conduction mode (CCM) active clamp flyback, such as that shown in FIG. 1, has positive magnetizing current, and therefore has lower RMS current. However, this circuit requires an external inductor to achieve full ZVS. In addition, the secondary rectifier turn-off is hard switched.

FIG. 2 is a schematic illustration of a traditional discontinuous conduction mode (DCM) active clamp flyback (ACF) converter. In contrast to the converter of FIG. 1, the magnetizing current of discontinuous conduction mode ACF or critical conduction mode ACF of the converter illustrated in FIG. 2 swings to a negative level. This may achieve ZVS turn-on for the low-side switch and may make zero-current-switching (ZCS) turn-off of the rectifier device possible.

In order to reduce the conduction loss of the rectifier diode especially in applications with high output current, synchronous rectifier (SR) topology is often used, as illustrated in FIG. 2. The SR scheme may include, for example, turning on the SR switch S3 in response to a sensed current through or a sensed voltage across the SR switch S3 indicating that the body diode of SR switch S3 is conducting. The SR switch S3 can be a Si MOSFET or GaN HEMT and operates in the third-quadrant to bring down the voltage drop.

The SR switch is generally controlled to conduct when the body diode starts carrying current and to block when the body diode current drops to zero. Due to such factors as circuitry delay and parasitic effects, the SR switch S3 has a delayed turn-on and an early turn-off, depending on the SR controller performance and circuit parasitics. When the SR switch is turned off, its body diode starts diverting the remaining current. If the body diode still carries high current when the SR switch S3 is turned off, a reverse recovery process happens. As a result, the circuit experiences high loss, voltage ringing, and EMI noise. Therefore, the current is reduced as much as possible before the SR switch S3 is turned off. If the diode current is zero and consequently off, it is under zero-current-switching (ZCS) turn-off condition. Such operation generally has the benefits of low loss, low voltage ringing, and low EMI noise.

In order to analyze the ACF operation, the ACF topology with the switch output capacitance is redrawn in FIG. 3. The operating waveforms of a traditional ACF converter, such as that illustrated in FIG. 3, is shown in FIG. 4. The output capacitor Co is large in capacitance, as indicated by its symbol, and therefore can be treated as a constant voltage source when analyzing the circuit.

During the interval when switch S1 is in the on state, the magnetizing inductance is charged and its current (ILm=ILr) increases linearly. In addition, secondary current (Is3) is zero during the interval with switch S1 in the on state.

At the end of the interval with switch S1 in the on state, switch S1 is turned off and switch S2 is turned on. Due to the current dividing effect between the two primary capacitors Coss and the secondary capacitor Cj, the inductor current Lr quickly drops to a value (Idip) that is lower than the peak of the magnetizing current (ILm). Then, during the interval with switch S2 on (or S1 OFF interval), Lr resonates with clamping capacitor Cr and the difference between inductor Lr current (iLr) and magnetizing current iLm is delivered to the load (Is3). The inductor current can be solved as $$i_{Lr}(t) = I_{dip}\cos(\omega t) + \frac{nV_o - V_{Cr}(0)}{Z} \cdot \sin(\omega t) \quad (1)$$

$$\omega = \frac{1}{\sqrt{C_r \cdot L_r}}, Z = \sqrt{\frac{L_r}{C_r}} \quad (2)$$

where Idip is the initial current of iLr before the resonant process; Vo is the output capacitor Co voltage and approximately equals to the output voltage of the transformer due to low voltage drop of SR switch S3; Vcr(0) is the initial voltage of the resonant capacitor Cr, which can be solved as (3) according to charge balance of resonant capacitor Cr.

$$V_r(0) = nV_o - \frac{I_{dip} \cdot \sqrt{\frac{L_r}{C_r}}}{\tan(\theta)}, \theta = \pi - \frac{(1-D) \cdot T_s}{2\sqrt{L_r C_r}} \quad (3)$$

where D is the duty cycle of S1 and Ts is the switching period.

Because clamping capacitor Cr only has current during the switch S1 OFF interval, combining equations (1) and (2), and implementing the law of charge balance, shows that at the end of the switch S1 OFF interval, iLr is −Idip. If at the end of the switch S1 OFF interval iLr is more negative than the iLm minimum, then switch S3 current (ISR) is positive, as shown in FIG. 4(a). When switch S2 is turned off, switch S3 will be forced off at high current and its body diode will go through reverse recovery and cause various problems including voltage ringing, power loss, and EMI emission noise.

Reducing the clamping capacitor Cr capacitance shortens the resonant period, which makes iLr actually merge with iLm shortly, interrupting the resonance of Lr and Cr. By the end of the switch S1 OFF interval, it is possible that iLr equals or substantially equals iLm, achieving ZCS for the secondary switch S3, as shown in FIG. 4(b).

However, as indicated in FIG. 4(b), the current of synchronous rectification switch S3 ($i_{S3}$) is cut off temporarily during the switch S1 OFF interval. Accordingly, the SR controller needs to turn on and off the SR switch twice during this interval. Such operation increases driving loss and causes instability of the circuit operation.

A minimum conduction time of SR switch S3 can be programed through the SR controller to avoid the multiple turn-on issue. However, the fixed minimum on-time causes operation anomaly at light load and impacts efficiency. In addition, the amplitude of the resonant current iLr is greater in FIG. 4(b) than that in FIG. 4(a). Such operation leads to greater RMS value and increases the conduction loss of switch S2 and the transformer winding.

In summary, to achieve ZCS of the secondary SR switch, existing ACF topology with primary resonant has the drawbacks of SR multiple turn-on and high RMS value of the primary current, which leads to poor SR control performance, high driving loss, high conduction loss, and low efficiency.

BRIEF SUMMARY OF THE INVENTION

One general aspect includes a converter circuit, including: an input. The converter circuit also includes a transformer having a primary side and a secondary side; a primary circuit connected to the primary side of the transformer, where the primary circuit includes: The converter circuit also includes a first switch connected to a ground. The converter circuit also includes a second switch connected to the first switch. The converter circuit also includes a clamping capacitor connected to the second switch and to the input; a secondary circuit connected to the secondary side of the transformer, where the secondary circuit includes: The converter circuit also includes a rectifying switch. The converter circuit also includes an output capacitor connected to the rectifying switch. The converter circuit also includes one or more controllers configured to turn on and off the first and second switches, such that a voltage is generated across the output capacitor, where during a first interval the first switch is on and the second switch is off, where during a second interval the first switch is off and the second switch is on, and where the controller is configured to turn on and off the rectifying switch such that the converter circuit has a secondary synchronous rectification operation, where during the second interval a current through the rectifying switch becomes substantially equal to zero less than two times regardless of: a) voltage at the input, b) average voltage across the output capacitor, and c) average current through the rectifying switch, and where at the end of the second interval a current through the rectifying switch is substantially zero.

Implementations may include one or more of the following features. The converter circuit where the clamping capacitor has a substantial effect on resonance of the circuit. The converter circuit where the clamping capacitor has substantially no effect on resonance of the circuit. The converter circuit where the secondary circuit further includes: a second rectifying switch, and a second output capacitor connected to the second rectifying switch, where resonance of the converter circuit is affected by the second output capacitor. The converter circuit where the output capacitor is connected directly to a load. The converter circuit where the secondary circuit further includes an lc filter connected to the output capacitor, where the lc filter is configured to generate a voltage output having less ripple than a ripple across the output capacitor.

One general aspect includes a converter circuit, including: an input. The converter circuit also includes a transformer having a primary side and a secondary side; a primary circuit connected to the primary side of the transformer, where the primary circuit includes: The converter circuit also includes a first switch connected to a ground. The converter circuit also includes a second switch connected to the first switch. The converter circuit also includes a clamping capacitor connected to the second switch and to the input; a secondary circuit connected to the secondary side of the transformer, where the secondary circuit includes: The converter circuit also includes a rectifying element. The converter circuit also includes an output capacitor connected to the rectifying element. The converter circuit also includes where a capacitance ratio defined by the value of the capacitance of the output capacitor divided by the square of the turns ratio of the transformer divided by the value of the capacitance of the clamping capacitor is less than 40.

Implementations may include one or more of the following features. The converter circuit where the rectifying element includes a diode. The converter circuit where the rectifying element includes a rectifying switch. The converter circuit where the clamping capacitor has a substantial effect on resonance of the circuit. The converter circuit where the clamping capacitor has substantially no effect on resonance of the circuit. The converter circuit where the secondary circuit further includes: a second rectifying element, and a second output capacitor connected to the second rectifying element, where resonance of the converter circuit is affected by the second output capacitor. The converter circuit where the output capacitor is connected directly to a load. The converter circuit where the secondary circuit further includes an lc filter connected to the output capacitor, where the lc filter is configured to generate a voltage output having less ripple than a ripple across the output capacitor.

One general aspect includes a converter circuit, including: an input. The converter circuit also includes a transformer having a primary side and a secondary side; a primary circuit connected to the primary side of the transformer, where the primary circuit includes: The converter circuit also includes a first switch connected to a ground. The converter circuit also includes a second switch connected to the first switch. The converter circuit also includes a clamping capacitor connected to the second switch and to the input; a secondary circuit connected to the secondary side of the transformer, where the secondary circuit includes: The converter circuit also includes a rectifying element. The converter circuit also includes an output capacitor connected to the rectifying element. The converter circuit also includes where the secondary circuit further includes an lc filter connected to the output capacitor, where the lc filter is configured to generate a voltage output having less voltage ripple than a voltage ripple across the output capacitor, and where the capacitance of the capacitor of the lc filter is greater than the capacitance of the output capacitor.

Implementations may include one or more of the following features. The converter circuit where the rectifying element includes a diode. The converter circuit where the rectifying element includes a rectifying switch. The converter circuit where the secondary circuit further includes: a second rectifying element, and a second output capacitor connected to the second rectifying element, where resonance of the converter circuit is affected by the second output capacitor. The converter circuit where the clamping capacitor has a substantial effect on resonance of the circuit. The converter circuit where the clamping capacitor has substantially no effect on resonance of the converter circuit.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

As discussed above, in conventional converters resonance is dominated by the clamping capacitor Cr. In embodiments discussed herein the output capacitor Co dominates or at least contributes significantly to the resonance of the converter.

Some embodiments of the present disclosure relate to power conversion circuits that improve the efficiency of and/or reduce the size of power adapters for electronic devices such as, for example, laptop computers. Some embodiments relate to active clamp flyback circuits with secondary resonance that allow soft switching under varied line and load conditions, recover leakage inductance and minimize snubber losses in the power conversion circuit. Some embodiments employ eMode GaN switches and an optimized active clamp flyback circuit to increase switching frequency while maintaining and/or improving efficiency. For example, in some embodiments, a magnetizing inductance of a transformer is used to achieve zero voltage switching turn-on for the primary side switches, and zero current turn-off switching for a secondary side synchronous rectification switch. As leakage inductance energy is recovered and the primary side switch voltage is clamped, the need for a snubber is minimized and the circuit can switch efficiently at high frequency.

Secondary-Resonant Scheme

Figure 5:
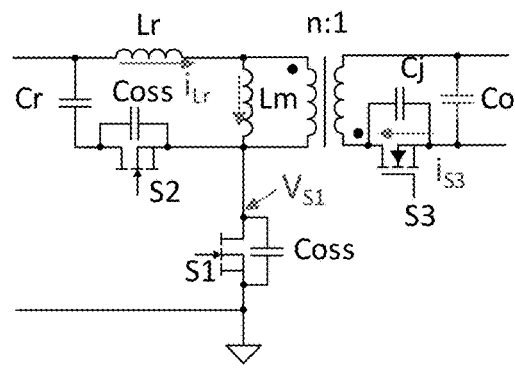
FIG. 5 is a schematic illustration of an Active Clamp Flyback Converter with a Secondary resonant capacitor.

FIG. 5 is an secondary-resonant scheme, which uses a small-capacitance output capacitor Co as the resonant element. The voltage ripple across output capacitor Co will be high, so this topology can be used in applications where output voltage ripple across output capacitor Co can be tolerated. The output capacitor Co in this scheme can be a high-quality capacitor with low ESR and ESL for low loss. The clamping capaictor Cr in this case is a high-capacitance capacitor such that its voltage can be treated as a constant voltage source in analysis. Coss is the output capacitance of S2 and S1, and Cj is the output capacitance of S3.

Figure 6:
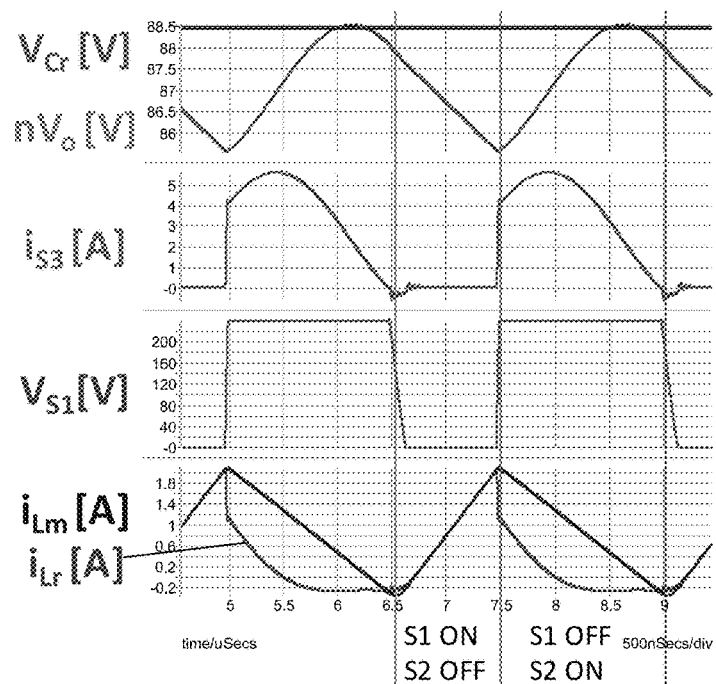
FIG. 6 is a waveform diagram showing operation of an Active Clamp Flyback Converter Waveforms with Secondary resonant capacitor.

The secondary-resonant ACF waveforms generated during operation of the circuit of FIG. 5 are shown in FIG. 6. The operation during the switch S1 ON interval is the same as conventional ACF converter, such as that illustrated in FIG. 3. When switch S1 is turned off, the iLr current drops to a lower value due to the current dividing effect depending on the ratio of the primary switch Coss to the secondary switch output capacitance Cj. This current drop has the same or similar cause as that of a traditional ACF converter, such as that illustrated in FIG. 3. When the commutation of switches S1, S2, and S3 is completed, Lr starts to resonate with the output capacitor Co and clamping capacitor Cr.

Figure 7:
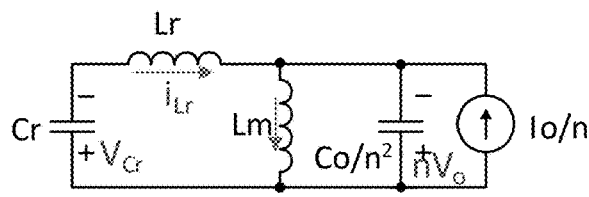
FIG. 7 is a schematic illustration of an equivalent circuit of the circuit of FIG. 6 during a switch S1 OFF interval.

FIG. 7 illustrates an equivalent circuit during the switch S1 ON interval, with the secondary components reflected to the primary side. Since clamping capacitor Cr has very large capacitance relative to the output capacitor Co, the resonance is dominated by output capacitor Co. Accordingly, this scheme is referred to as a secondary-resonant scheme. The inductor current iLr can be solved as $$i_{Lr}(t) = \left(\frac{nV_o}{\omega L_m} + \frac{nV_o(0) - V_r}{Z}\right) \cdot \sin(\omega t) - \left(I_{pk} - \frac{I_o}{n} - I_{dip}\right) \cdot \cos(\omega t) + \left(I_{pk} - \frac{I_o}{n} - \frac{nV_o}{L_m} \cdot t\right) \quad (4)$$

$$\omega = \frac{1}{\sqrt{L_{lk} \cdot C_o/n^2}}, Z = \sqrt{\frac{L_{lk}}{C_o/n^2}} \quad (5)$$

where Vr is the voltage across clamping capacitor Cr, and is treated as constant. Vo is the average of output voltage, Ipk is peak value of the magnetizing current. Vo(0) is the initial voltage of the output capacitor Co, and the value of Vo(0) depends on when the iLr current equals the iLm current, and can be very complicated to calculate. In some embodiments, it is preferred to let the iLr current become equal to the iLm current as close as possible to the end of the switch S1 OFF interval, in order to minimize RMS current value and lower conduction loss. This may be determined, for example, using a simulator. Therefore, it is reasonable to assume that the iLr current becomes equal to the iLm current right at the end of the switch S1 OFF interval. Then Vo(0) can be solved with equation (6) by implementing charge balance of Cr.

$$nV_o(0) - V_r = \frac{\left(I_{pk} - \frac{I_o}{n} - I_{dip}\right) \cdot Z \cdot \sin[\omega(1-D)T_s] - \omega D T_s I_o Z/n}{1 - \cos[\omega(1-D)T_s]} - \frac{nV_o L_k}{L_m} \quad (6)$$

By substituting equation (6) into the equation (4), the resonant inductor current iLr can be determined as $$i_{Lr}(t) \approx \frac{-\omega D T_s I_o/n}{1 - \cos[\omega \cdot (1-D)T_s]} \cdot \sin(\omega t) - \quad (7)$$

$$\left(I_{pk} - \frac{I_o}{n} - I_{dip}\right) \cdot \cos(\omega t) + \left(I_{pk} - \frac{I_o}{n} - \frac{nV_o}{L_m} \cdot t\right)$$

The derivative of equation (7) is $$\frac{di_{Lr}(t)}{dt} \approx \quad (8)$$

$$\frac{-\omega D T_s I_o/n}{1 - \cos[\omega \cdot (1-D)T_s]} \cdot \omega \cos(\omega t) + \left(I_{pk} - \frac{I_o}{n} - I_{dip}\right) \cdot \omega \sin(\omega t) - \frac{nV_o}{L_m}$$

Figure 1:
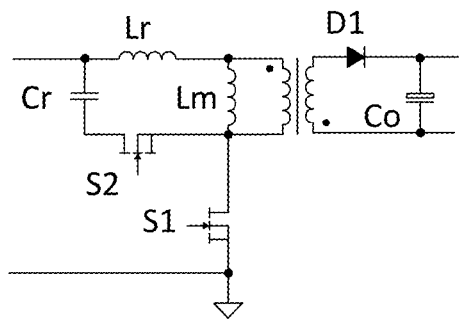
FIG. 1 is a schematic illustration of an Active Clamp Flyback Converter with a diode rectifier.
Figure 2:
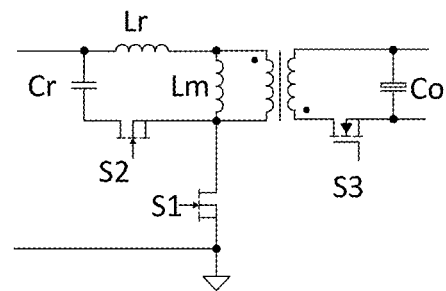
FIG. 2 is a schematic illustration of an Active Clamp Flyback Converter with a synchronous rectifier.
Figure 3:
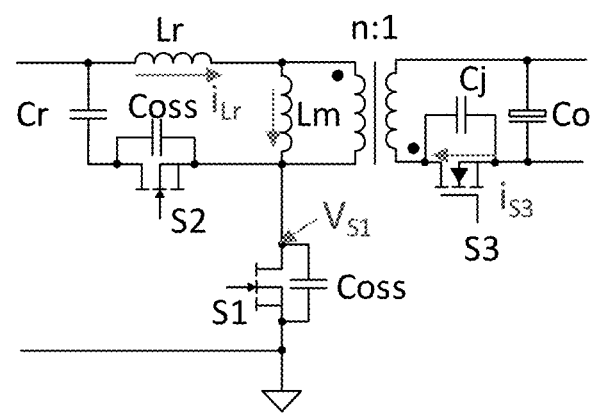
FIG. 3 is a schematic illustration of an Active Clamp Flyback Converter showing parasitic capacitances.
Figure 4A:
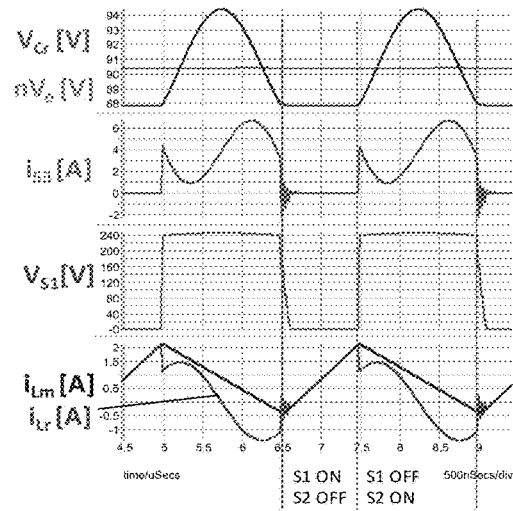
FIGS. 4A and 4B are waveform diagrams showing operation of an Active Clamp Flyback Converter without Secondary ZCS (4A) and with Secondary ZCS (4B).
Figure 4B:
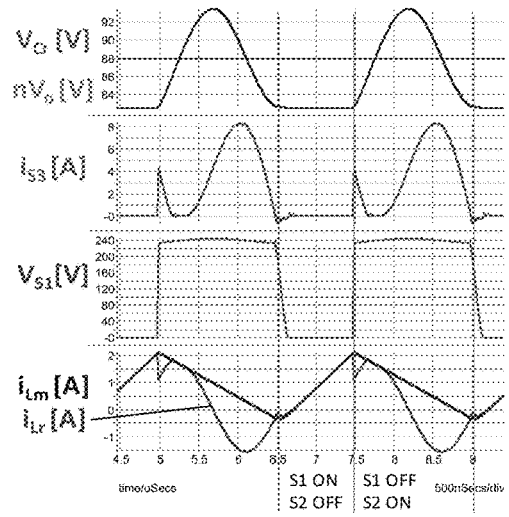

At t=0, the value of the derivative of the iLr current, as determined by equation (8), is always negative. Accordingly, the iLr current continues to decrease. Without resonating back to a more positive value, the iLr current is always less than the iLm current during the switch S1 OFF interval. Accordingly, in contrast to the operation of the primary-resonant circuit as illustrated in FIG. 3, the secondary switch S3 current iS3 of this embodiment, will not drop to zero twice during the switch S1 OFF interval regardless of voltage at the input, average voltage across the output capacitor, and average current through the rectifying switch. Accordingly, this secondary-resonant scheme eliminates the double-turn-on issue of the SR switch, achieves reliable SR controller operation, and improves ACF efficiency.

Figure 8:
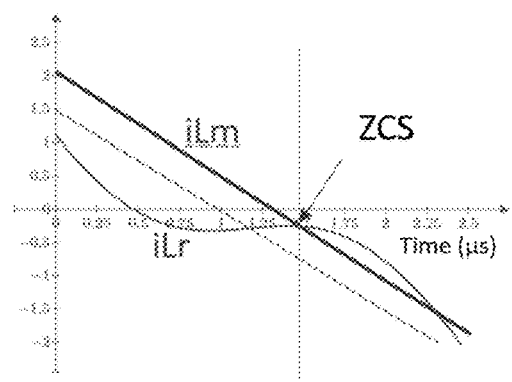
FIG. 8 is a plot of iLm and iLr.

In equation (7), the last term is a linear-reducing function, and the first two terms constitute a resonant function superimposed on the linear-reducing function. Equation (7) is plotted in FIG. 8 with magnetizing current iLm. The dashed green line represents the linear reducing term in equation (7). The residence of the iLr current is centered around or superimposed on the linear decreasing term, such that the iLr current experiences a substantially flat or 0 derivative portion at the bottom, which is lower in RMS than that of the primary-resonant scheme, for example, as illustrated.

Figure 9:
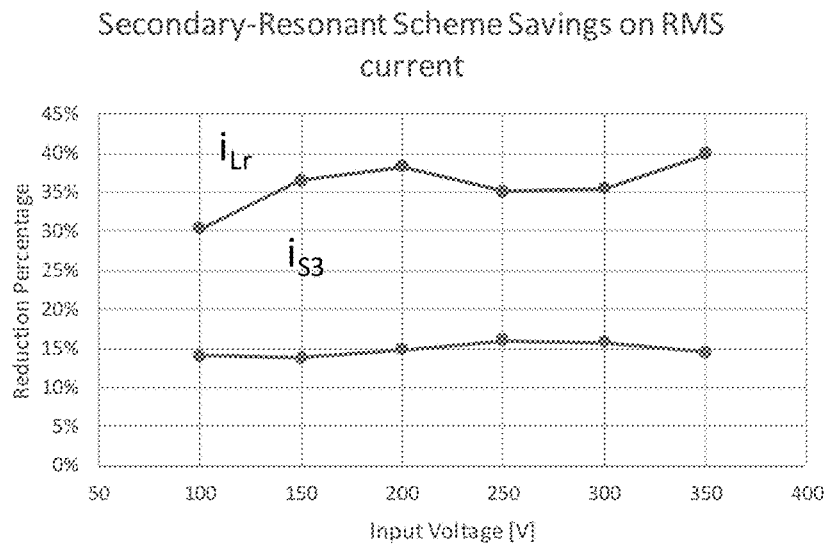
FIG. 9 is a graph showing RMS Current performance.

Primary-resonant and secondary resonant schemes were simulated and RMS values of the resonant current iLr and the secondary SR current iS3 are compared. The simulation was performed with 150V input, 20V/2.25 A output, transformer turns ratio=4.3, Lr=900 nH. FIG. 9 illustrates plots of the RMS current reductions in the resonant current iLr and the secondary SR current iS3 achieved by using secondary-resonant scheme over the conventional primary-resonant scheme, as illustrated in FIG. 3. As indicated, the reduction of resonant current iLr is above 30% over a wide input voltage range, and the reduction of the secondary SR current iS3 is about 15% over the wide input voltage range. As understood by those of skill in the art, the RMS current savings directly translates into conduction loss reduction.

As a result, the secondary-resonant ACF scheme, for example as illustrated in FIG. 5, has more reliable ZCS performance without double-turn-on of the secondary SR switch, and has lower RMS current than the conventional primary-resonant scheme, as illustrated in FIG. 3.

Mixed-Resonant Scheme

If the capacitance of the clamping capacitor Cr is comparable to the capacitance of output capacitor Co/n2, both the clamping capacitor Cr and the output capacitor Co will have significant impact on the resonant process with inductor Lr. Since this scheme has both primary resonance and secondary resonance, it may be referred to as as a mixed-resonant scheme. The equivalent circuit during the resonant process is same as that in FIG. 7.

The solution for the inductor Lr current (iLr) is obtained as $$i_{Lr}(t) = \left(\frac{nV_o k}{\omega L_m} + \frac{nV_o(0) - V_r(0)}{Z}\right) \cdot \sin(\omega t) - \quad (9)$$

$$\left(kI_{pk} - \frac{kI_o}{n} - I_{dip}\right) \cdot \cos(\omega t) + \left(I_{pk} - \frac{I_o}{n} - \frac{nV_o}{L_m} \cdot t\right) \cdot k$$

$$k = \frac{C_r}{C_o/n^2 + C_r}, \omega = \frac{1}{\sqrt{L_r \cdot k \cdot C_o/n^2}}, Z = \sqrt{\frac{L_r}{k \cdot C_o/n^2}} \quad (10)$$

The secondary-resonant is the special case of mixed-resonant scheme when k=1 where equations (9) and (10) collapse to equations (4) and (5), respectively.

In real circuits where k may approach 1, the effect of the clamping capacitor Cr on resonance is substantially zero. For example, in some embodiments, k>0.999, and the effect of the clamping capacitor Cr is substantially zero and the resonance is dominated by the capacitance of the output capacitor. For example, in some embodiments, k>0.99, and the effect of the clamping capacitor Cr is substantially zero and the resonance is dominated by the capacitance of the output capacitor. For example, in some embodiments, k>0.9, and the effect of the clamping capacitor Cr is substantially zero and the resonance is dominated by the capacitance of the output capacitor. For example, in some embodiments, k>0.1, and the effect of the clamping capacitor Cr is substantially zero and the resonance is dominated by the capacitance of the output capacitor. For example, in some embodiments, k>0.05, and the effect of the clamping capacitor Cr is substantially zero and the resonance is dominated by the capacitance of the output capacitor. For example, in some embodiments, k>0.025, and the effect of the clamping capacitor Cr is substantially zero and the resonance is dominated by the capacitance of the output capacitor.

In embodiments where the clamping capacitor Cr substantially effects circuit resonance, the resonant current will split between primary and secondary sides in a ratio dependent on k. Accordingly, the ratio between the capacitance of clamping capacitor Cr and and output capacitor Co effects the distribution of the resonant current. Therefore, the waveform shape of the primary current iLr and the secondary current iS3 changes and impacts the RMS values of the primary current iLr and the secondary current iS3.

Figure 10:
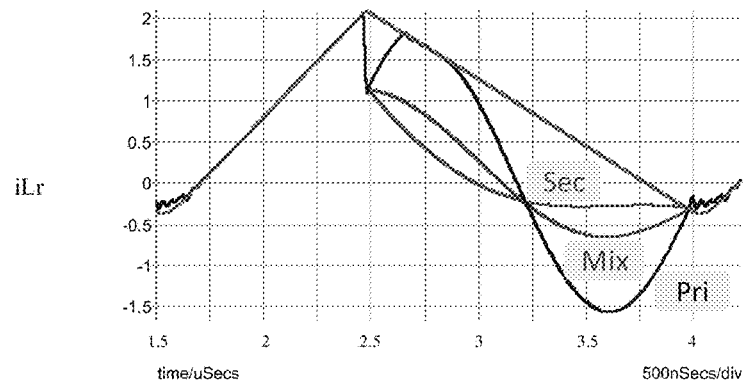
FIG. 10 is a plot of iLr for different schemes.
Figure 11:
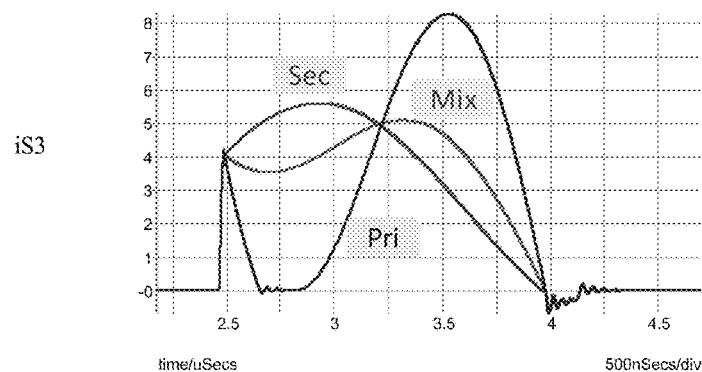
FIG. 11 is a plot of iS3 for different schemes.
Figure 12:
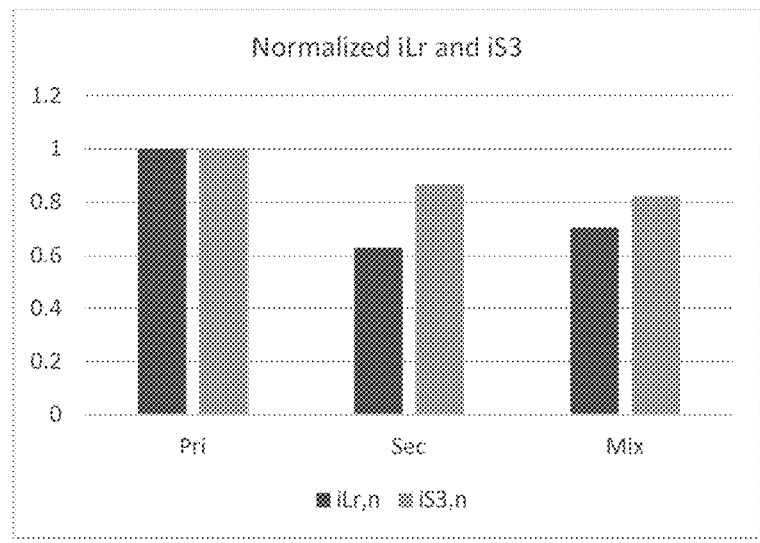
FIG. 12 is a graph comparing RMS current for different schemes.

Simulation results comparing three different methods, namely, primary-resonant, secondary-resonant, and mixed primary-secondary resonant are shown in FIGS. 10 and 11. The primary inductor current iLr and the secondary rectifier switch current iS3 are plotted. The RMS current values using different resonant schemes are normalized to the RMS current with primary-resonant scheme and compared in FIG. 12. As shown, secondary-resonant and mixed-resonant have lower RMS values than primary-resonant has. While the secondary-resonant scheme shows lower inductor current than the mixed-resonant, it has higher rectifier switch current. The overall conduction loss depends on the resistances of primary and secondary sides. With fixed design of resistances, lowest overall conduction loss can be achieved by optimizing the current distribution using different Cr/Co ratio in mixed-resonant scheme.

In some embodiments, the capacitance value of the output capacitor Co is determined based on its effect on ZCS. Accordingly, to minimize ZCS the value of the output capacitor Co causes the iLr and the iLm currents to be substantially equal at the end of the switch S1 Off interval. In addition, the capacitance value of the clamping capactir Cr causes the current of synchronous rectification switch S3 ($i_{S3}$) to remain on during the switch S1 OFF interval so that synchronous rectification may be used without turning on and off the SR switch twice during the switch S1 Off interval.

A metric for comparing embodiments of the primary resonant circuit, the secondary resonant circuit, and the mixed primary-secondary resonant circuit is an angular frequency defined by:

$$\omega_{Co} = \frac{1}{\sqrt{L_r \cdot C_o / n^2}}$$

This angular frequency provides an indication of the contribution of the output capacitor Co to the resonance of the circuit.

For the primary resonant circuit, $\omega_{Co}$ corresponds with a period which is much greater than the switch S1 Off time, as shown, for example, in FIG. 6. For example, the period corresponding with $\omega_{Co}$ may be greater than 20 times the switch S1 Off time. In contrast, for the secondary resonant circuit and the mixed primary-secondary resonant circuit, the period corresponding with $\omega_{Co}$ may, for example, be less than about 10 times the switch S1 Off time. In some embodiments of the secondary resonant circuit and the mixed primary-secondary resonant circuit, the period corresponding with $\omega_{Co}$ may, for example, be less than about 10, 5, 4, 3, 2, 1.5, or 1.25 times the switch S1 Off time. In some embodiments of the secondary resonant circuit and the mixed primary-secondary resonant circuit, the period corresponding with $\omega_{Co}$ may have another value.

Another metric for comparing embodiments of the primary resonant circuit, the secondary resonant circuit, and the mixed primary-secondary resonant circuit is a ratio of effective capacitances, defined by:

$$Creff = \frac{C_o / n^2}{C_r}$$

The ratio Creff provides an indication of the contribution of the output capacitor Co to the resonance of the circuit relative to the contribution of the clamping capacitor Cr to the resonance.

For the primary resonant circuit, the contribution of the output capacitor Co to the resonance of the circuit is negligible relative to the contribution of the clamping capacitor Cr. For example, in primary resonant circuits Creff may be greater than 50. In contrast, for the secondary resonant circuit and the mixed primary-secondary resonant circuit, Creff may be less than about 40. In some embodiments of the secondary resonant circuit and the mixed primary-secondary resonant circuit, Creff may be less than about 40, 30, 20, 10, 5, 4, 3, 2, 1, 0.5, 0.3, 0.25, 0.2, 0.15, 0.1, 0.05, 0.025, or 0.01, such that the effect of the clamping capacitor Cr is substantially zero and the resonance is dominated by the capacitance of the output capacitor.. In some embodiments of the secondary resonant circuit and the mixed primary-secondary resonant circuit, Creff may have another value.

Another metric for comparing embodiments of the primary resonant circuit, the secondary resonant circuit, and the mixed primary-secondary resonant circuit is the output voltage ripple at output capacitor Co.

For the primary resonant circuit, ripple is reduced by using a large output capacitor Co. For example, in primary resonant circuits, the output voltage ripple may be less than 1%. In contrast, for the secondary resonant circuit and the mixed primary-secondary resonant circuit, the output voltage ripple and the output capacitor Co may be greater than about 2.5%. In some embodiments of the secondary resonant circuit and the mixed primary-secondary resonant circuit, the output voltage ripple at the output capacitor Co may be greater than about 4%, 5%, 6%, 7%, 8%, 9%, 10%, 11%, 12%, 13%, 14%, 15%. In some embodiments of the secondary resonant circuit and the mixed primary-secondary resonant circuit, the output voltage ripple at the output capacitor Co may have another value.

Topology Variants

The ACF output capacitor Co may be used as a resonant element in many different topologies.

FIG. 5 shows one implementation of this concept. In the embodiment of FIG. 5, the resonant capacitor directly feeds the load. In this embodiment, the load tolerates the voltage ripple across the output capacitor. In this topology, the clamping capacitor Cr can have different values in order to use secondary-resonant scheme or mixed-resonant scheme.

Figure 13:
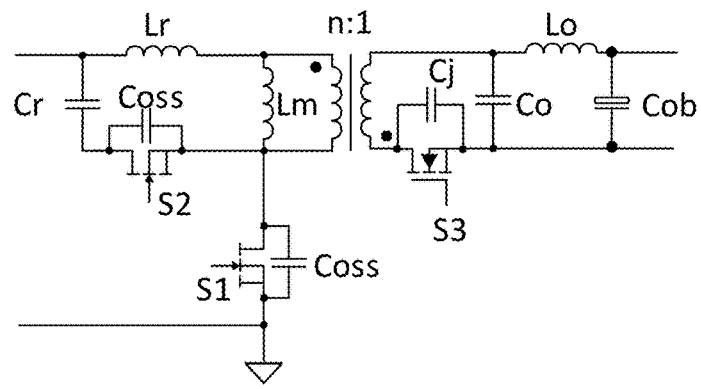
FIG. 13 is a schematic illustration of another embodiment.

In some embodiments, for example, if tight regulation on output voltage ripple is required, a filter, such as an additional LC filter stage can be added after the output capacitor Co, as shown in FIG. 13. Inductor Lo is the filter inductor and Cob is the filter capacitor.

Capacitor Cob can have very capacitance greater than the capacitance of the output capacitor Co. In some embodiments, capacitor Cob can has a capacitance greater than 1.5, 2, 5, 10, or 100 times the capacitance of the output capacitor Co.

An advantageous aspect of embodiments with the capacitance of capacitor Cob being significantly greater than the capacitance of output capacitor Co is that the circulating current experienced by the resonant output capacitor Co generates only low loss from the effective series resistance (ESR) of the resonant output capacitor Co. As understood by those of skill in the art, because of the LC filnter, losses due to ESR are limited to the the resnonat output capacitor Co, which has a relatively low ESR. As a result, the large capacitor Cob provides the benefit of low output ripple without the cost of high ESR loss. And while the output capacitor Co may experience voltage ripple greater than what would be acceptable to a load, because of its low ESR as compared with the large capacitor Cob of the LC filter, the output capacitor Co generates relatively low ESR loss.

Figure 16:
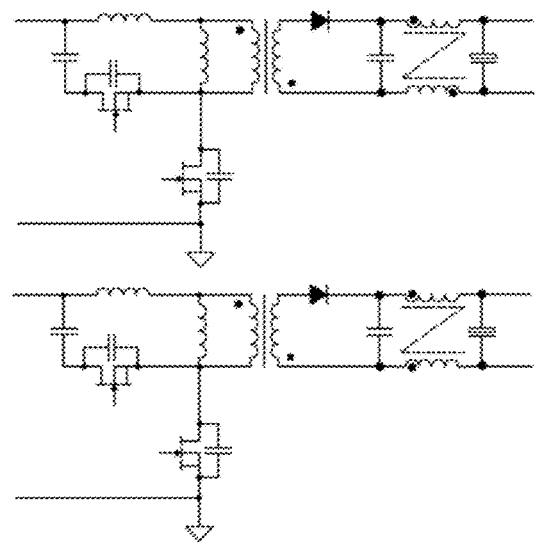
FIG. 16 is a schematic illustration of another embodiment.

In some embodiments, inductor Lo is a discrete inductor. In some embodiments, inductor Lo can be a leakage inductance of a common mode choke. For example, a n=1 transformer may be connected between the output capacitor Co and the large capacitor Cob such that the primary side of the transformer is connected between the output capacitor Co and the large capacitor Cob in the source path of current to a load and the secondary side of the transformer is connected between the output capacitor Co and the large capacitor Cob in the return path of current to from the load, for example, as illustrated in FIG. 16, discussed below.

In some embodiments, the corner frequency of the LC filter may be less than the resonant frequency of the circuit, as determined, for example, by ω of equation 10.

As understood by those of skill in the art, the embodiment of FIG. 13 has features and operational characteristics which are similar or identical to those of the embodiment illustrated in FIG. 5.

Figure 14:
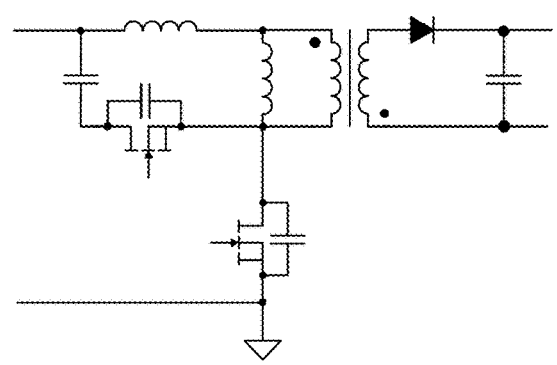
FIG. 14 is a schematic illustration of another embodiment.
Figure 15:
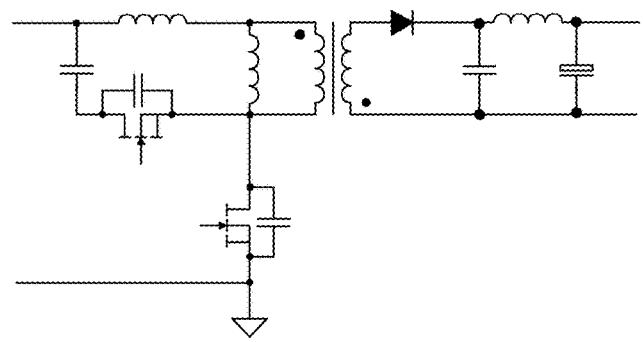
FIG. 15 is a schematic illustration of another embodiment.

In some embodiments, if a diode is used as the secondary rectifier instead of a SR switch, secondary-resonant and mixed-resonant scheme can be used to reduce the conduction loss and reduce reverse-recovery of the diode. Embodiments of this topology are shown in FIGS. 14, 15, and 16. The embodiments of FIG. 16, the inductor of the LC filter is formed by a leakage inductance of a common mode choke. As understood by those of skill in the art, the embodiments of FIGS. 14, 15, and 16 have features and operational characteristics which are similar or identical to those of the embodiments illustrated in FIGS. 5 and 13.

Figure 17:
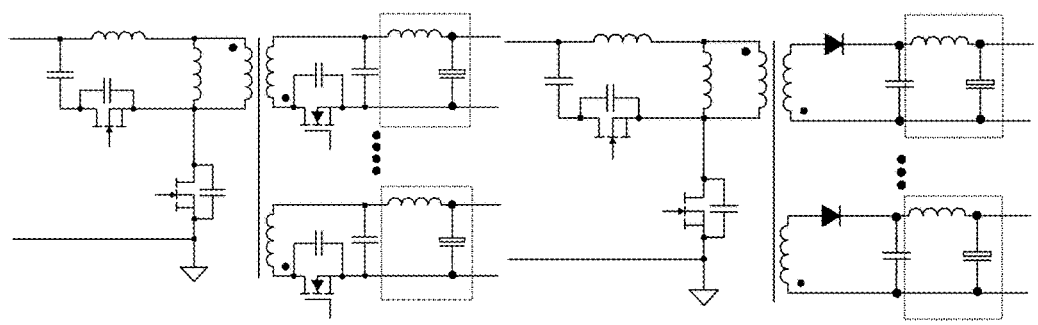
FIG. 17 is a schematic illustration of other embodiments.

FIG. 17 illustrates embodiments of a secondary-resonant or mixed-resonant scheme with multiple outputs. The output capacitors of one or more output branches can be used as resonant elements. The primary clamping capacitor can have different capacitance values in order to use secondary-resonant scheme or mixed-resonant scheme. LC filter stages are optionally used. Rectifier elements at the secondary side can be, for example, diodes, Si MOSFETs, GaN HEMTs, or other switches. As understood by those of skill in the art, the embodiment of FIG. 17 has features and operational characteristics which are similar or identical to those of the embodiments discused elsewhere.

Figure 18A:
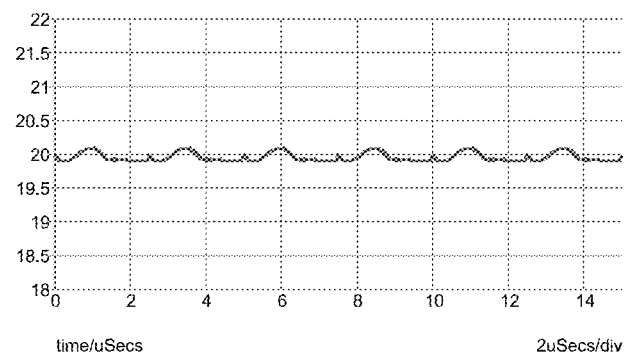
FIGS. 18A and 18B are plots illustrating output capacitor Co ripple for different schemes.
Figure 18B:
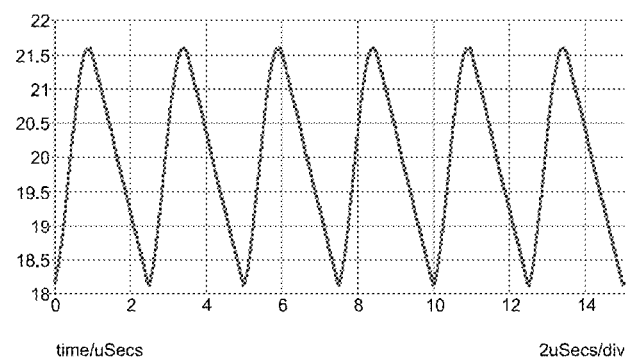
Figure 19:
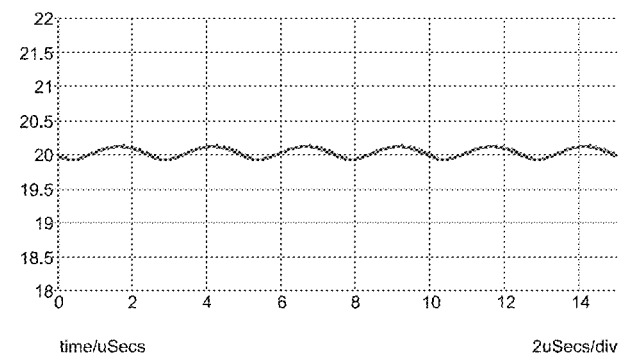
FIG. 19 is a plot illustrating load capacitor Cob ripple for an embodiment with an LC filter.

FIGS. 18A, 18B and 19 illustrate simulation results comparing three different methods, namely, primary-resonant, secondary-resonant or mixed primary-secondary resonant with no LC filter, and secondary-resonant or mixed primary-secondary resonant with an LC filter. As illustrated, primary-resonant and secondary-resonant or mixed primary-secondary resonant with an LC filter topologies generate minimal ripple as compared with the topology with secondary-resonant or mixed primary-secondary resonant with no LC filter.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A converter circuit, comprising:
   an input;
   a transformer having a primary side and a secondary side;
   a primary circuit connected to the primary side of the transformer, wherein the primary circuit comprises:
   a first switch connected to a ground,
   a second switch connected to the first switch, and
   a clamping capacitor, comprising:
      a first terminal connected to the second switch, and
      a second terminal connected to the input;
   a secondary circuit connected to the secondary side of the transformer, wherein the secondary circuit comprises:
      a rectifying switch, and
      an output capacitor connected to the rectifying switch; and
   one or more controllers configured to turn on and off the first and second switches, such that a voltage is generated across the output capacitor, wherein during a first interval the first switch is on and the second switch is off, wherein during a second interval the first switch is off and the second switch is on, and wherein the controller is configured to turn on and off the rectifying switch such that the converter circuit has a secondary synchronous rectification operation,
      wherein during the second interval a current through the rectifying switch becomes substantially equal to zero less than two times regardless of: a) voltage at the input, b) average voltage across the output capacitor, and c) average current through the rectifying switch, and wherein at the end of the second interval a current through the rectifying switch is substantially zero.

2. The converter circuit of claim 1, wherein the clamping capacitor has a substantial effect on resonance of the circuit.

3. The converter circuit of claim 1, wherein the clamping capacitor has substantially no effect on resonance of the circuit.

4. The converter circuit of claim 1, wherein the secondary circuit further comprises:
   a second rectifying switch, and
   a second output capacitor connected to the second rectifying switch,
   wherein resonance of the converter circuit is affected by the second output capacitor.

5. The converter circuit of claim 1, wherein the output capacitor is connected directly to a load.

6. The converter circuit of claim 1, wherein the secondary circuit further comprises an LC filter connected to the output capacitor, wherein the LC filter is configured to generate a voltage output having less ripple than a ripple across the output capacitor.

7. A converter circuit, comprising:
   an input;
   a transformer having a primary side and a secondary side;
   a primary circuit connected to the primary side of the transformer, wherein the primary circuit comprises:
   a first switch connected to a ground,
   a second switch connected to the first switch, and
   a clamping capacitor, comprising:
      a first terminal connected to the second switch, and
      a second terminal connected to the input;
   a secondary circuit connected to the secondary side of the transformer, wherein the secondary circuit comprises:
      a rectifying element, and
      an output capacitor connected to the rectifying element,
   wherein the secondary circuit further comprises an LC filter connected to the output capacitor, wherein the LC filter is configured to generate a voltage output having less voltage ripple than a voltage ripple across the output capacitor, and wherein the capacitance of the capacitor of the LC filter is greater than the capacitance of the output capacitor.

8. The converter circuit of claim 7, wherein the rectifying element comprises a diode.

9. The converter circuit of claim 7, wherein the rectifying element comprises a rectifying switch.

10. The converter circuit of claim 7, wherein the secondary circuit further comprises:
   a second rectifying element, and
   a second output capacitor connected to the second rectifying
   element,
   wherein resonance of the converter circuit is affected by the second output capacitor.

11. The converter circuit of claim 7, wherein the clamping capacitor has a substantial effect on resonance of the circuit.

12. The converter circuit of claim 7, wherein the clamping capacitor has substantially no effect on resonance of the converter circuit.

* * * * *